(12) United States Patent
Martin et al.

(10) Patent No.: US 6,362,273 B1
(45) Date of Patent: Mar. 26, 2002

(54) AQUEOUS POLYMER DISPERSIONS

(75) Inventors: Emilio Martin; Gerardus Cornelis Overbeek; Yvonne Wilhelmina Smak, all of Waalwijk (NL)

(73) Assignee: Avecia BV, Waalwijk (NL)

( * ) Notice: Subject to any disclaimer, the term of this patent is extended or adjusted under 35 U.S.C. 154(b) by 0 days.

(21) Appl. No.: 09/509,376

(22) PCT Filed: Mar. 27, 1998

(86) PCT No.: PCT/EP98/05886

§ 371 Date: Mar. 27, 2000

§ 102(e) Date: Mar. 27, 2000

(87) PCT Pub. No.: WO99/16805

PCT Pub. Date: Apr. 8, 1999

(30) Foreign Application Priority Data

Sep. 26, 1997 (GB) ............................................. 9720483

(51) Int. Cl.$^7$ ............................... C08J 3/00; C08J 3/02; C08K 3/20; C08L 75/00; C08F 8/30
(52) U.S. Cl. ..................... 524/591; 524/457; 524/507; 524/839; 524/840; 525/123; 525/127; 525/455
(58) Field of Search ................................. 524/457, 507, 524/591, 839, 840; 525/123, 127, 455

(56) References Cited

U.S. PATENT DOCUMENTS

| | | | |
|---|---|---|---|
| 4,948,829 A | * 8/1990 | Mitsuji et al. | 524/457 |
| 5,104,737 A | * 4/1992 | Arora | 428/423.1 |
| 5,141,983 A | * 8/1992 | Hasegawa et al. | 524/457 |
| 5,854,332 A | * 12/1998 | Swarup et al. | 524/507 |

FOREIGN PATENT DOCUMENTS

| | | |
|---|---|---|
| EP | 0 308 115 A2 | 3/1989 |
| EP | 0 309 114 A1 | 3/1989 |
| EP | 0 379 158 A3 | 7/1990 |

* cited by examiner

*Primary Examiner*—Patrick D. Niland
(74) *Attorney, Agent, or Firm*—Pillsbury Winthrop LLP

(57) ABSTRACT

Aqueous polymer dispersion containing a water-dispersed polyurethane polymer and a vinyl (preferably acrylic) polymer in a weight ratio of from 30/70 to 5/95, wherein said polyurethane polymer is the reaction product of:

A) an isocyanate-terminated polyurethane prepolymer having an acid value of ≧44 mg KOH/g of prepolymer (solids) and formed from reactants comprising an organic polyisocyanate component and an organic poly(isocyanate-reactive) group) component in which the isocyanate-reactive groups are selected from —OH and optionally one or more of —NH$_2$, —NH—, and —SH (usually a polyol), wherein
  i) at least 70 weight % of said polyisocyanate component is constituted by at least one aliphatic polyisocyanate,
  ii) said poly(isocyanate-reactive group) component includes at least one acid-bearing poly(isocyanate-reactive group) compound for providing anionic groups which provide or contribute to water-dispersibility,
  iii) the reactants are used in amounts corresponding to a ratio of isocyanate groups to isocyanate-reactive groups (usually hydroxyl) within the range of 1.4/1 to 2.9/1; and B) an active hydrogen chain-extending compound(s).

44 Claims, No Drawings

AQUEOUS POLYMER DISPERSIONS

The present invention relates to certain aqueous polymer dispersions containing a polyurethane polymer and a vinyl polymer.

Aqueous polyurethane dispersions which are used as or provide the basis of aqueous-based coating compositions are well known for the production of coatings on various substrates. They may be used for the provision of e.g. protective or decorative coatings since polyurethanes, depending on their particular composition, can possess many desirable properties such as good chemical resistance, water-resistance, solvent resistance, toughness, abrasion-resistance, substrate adhesion and durability. Dispersion of the polyurethane in the aqueous system has been achieved either by the use of external surfactants or, more usefully, by including appropriate chain-pendant ionic and/or nonionic groups in the structure of the polyurethane polymer. In the latter respect, such aqueous polyurethane dispersions are particularly advantageously prepared (as is by now well-known in the art) by dispersing an isocyanate-terminated polyurethane prepolymer bearing ionic and/or nonionic dispersing groups into an aqueous medium and reacting the prepolymer with an active hydrogen-containing chain extender during and/or after dispersion in the aqueous medium. In an alternative well known process, known as the "acetone" process, the prepolymer is chain-extended while dissolved in an organic solvent (usually acetone) followed by the addition of water until water becomes the continuous phase and the subsequent removal of the solvent.

It is also now well known to modify the properties of polyurethane coatings derived from aqueous dispersions thereof by incorporating vinyl polymers, and in particular acrylic polymers, into the dispersions. For example, the use of acrylic polymers may allow upgrading of the coatings by increasing their hardness. Such dispersions may include the polyurethane and vinyl polymers as a simple blend of the preformed polymer dispersions. However, several patents, for example U.S. Pat. Nos. 3,705,164, 4,198,330 and 4,318,833, EP 0189945 and EP 0308115, describe processes where the vinyl polymer is formed in situ by polymerising one or more vinyl monomers in the presence of an aqueous dispersion of a polyurethane containing anionic salt groups. Such in-situ formation of the vinyl polymer can be advantageous in that it may result in greater dispersion stability and may further improve the performance of the resulting coating in comparison to simple blending of the polyurethane and vinyl polymers.

We have now discovered certain of these aqueous polyurethane/vinyl polymer dispersions (the vinyl polymer being incorporated as a simple blend or being present as a preformed polymer when the polyurethane prepolymer is chain extended, or more preferably being formed in-situ) which provide coatings of exceptionally good block resistance and exceptionally good imprint resistance. This is especially advantageous in many wood and board (i.e. compressed and glued wood particles or fibres) coating applications, for which the invention aqueous polymer dispersions are particularly useful, where the avoidance of coated substrates tending to stick together (i.e. block), as e.g. in coated window and door frames or in stacked coated boards (during storage), is highly desirable. In addition, the invention polymer dispersions provide coatings having good resistance to many chemicals and solvents including e.g. household chemicals. Still further, the urethane component of the dispersions, which are of relatively high acid value (see following), may significantly depress the minimum film forming temperatures (MFT) of high Tg vinyl polymers which may be used in the dispersion, without reducing the hardness. Also, the in situ prepared urethane/vinyl polymer dispersions show a favourable hardness/MFT balance.

According to the present invention there is provided an aqueous polymer dispersion containing a water-dispersed polyurethane polymer and a vinyl polymer in a weight ratio of from 30/70 to 5/95 wherein said polyurethane polymer is the reaction product of:

A) an isocyanate-terminated polyurethane prepolymer having an acid value of $\geq 44$ mg KOH/g of prepolymer (solids) and formed from reactants comprising an organic polyisocyanate component and an organic poly(isocyanate-reactive group) component in which the isocyanate-reactive groups are selected from —OH and optionally one or more of —NH$_2$, —NH—, and —SH, wherein
  i) at least 70 weight % of said polyisocyanate component is constituted by at least one aliphatic polyisocyanate,
  ii) said poly(isocyanate-reactive group) component includes at least one acid-bearing poly(isocyanate-reactive group) compound for providing anionic groups which provide or contribute to water-dispersibility,
  iii) the reactants are used in amounts corresponding to a ratio of isocyanate groups to isocyanate-reactive groups within the range of 1.4/1 to 2.9/1; and B) an active hydrogen chain-extending compound(s).

There is further provided according to the invention a process for the production of an aqueous polymer dispersion containing a water-dispersed polyurethane polymer and a vinyl polymer, wherein said process comprises:

I synthesising an isocyanate-terminated polyurethane prepolymer having an acid value of $\geq 44$ mg KOH/g of prepolymer (solids) from reactants comprising an organic polyisocyanate component and an organic poly(isocyante-reactive group) component in which the isocyanate-reactive groups are selected from —OH and optionally one or more of —NH$_2$, —NH—, and —SH; wherein
  (i) at least 70 weight % of said polyisocyanate component is constituted by at least one aliphatic polyisocyanate,
  (ii) said poly(isocyanate-reactive group) component includes at least one acid-bearing poly(isocyanate-reactive group) compound for providing anionic groups which provide or contribute to water-dispersibility,
  (iii) the reactants are used in amounts corresponding to a ratio of isocyanate groups to isocyanate-reactive groups within the range of 1.4/1 to 2.9/1;

II chain extending the polyurethane prepolymer using an active hydrogen chain extending compound(s) to form a polyurethane polymer;

III forming an aqueous dispersion of said polyurethane polymer;

IV incorporating a vinyl polymer into said polyurethane polymer dispersion, whereby the weight ratio of the polyurethane polymer to the vinyl polymer is within the range of from 30/70 to 5/95.

The stages II, III and IV of the process are not necessarily carried out sequentially in the order shown or as individual steps (i.e. any desired order or regime can be used), as will become apparent later. (For example, the chain extension step may be carried out simultaneously with the formation of the aqueous polyurethane polymer dispersion by dispersion of the polyurethane prepolymer into an aqueous medium containing the chain-extender, or into an aqueous medium into which the chain-extender is subsequently incorporated; also, in such embodiments, rather than, as is usual, effecting vinyl polymerisation subsequent to chain-extension it would in principle be be possible to disperse the prepolymer into an aqueous dispersion of a preformed vinyl polymer with simultaneous or subsequent chain extension of the prepolymer. Use of the "acetone" process, however, will normally entail stages II and III being separate steps and performed sequentially. It might also be possible, for example, to carry out stages II, III and IV simultaneously).

There is further provided according to the invention a coating obtainable or derived from an aqueous composition comprising an aqueous polymer dispersion as defined above.

There is further provided according to the invention a method of coating a substrate using an aqueous composition comprising an aqueous polymer dispersion as defined above.

There is further provided according to the invention a substrate having a coating obtainable or derived from an aqueous composition comprising an aqueous polymer dispersion as defined above.

(It is to be understood that the vinyl polymer component of the invention dispersion could in fact be more than one vinyl polymer, e.g. 2 or more vinyl polymers, such as might be formed by a multi-stage vinyl polymerisation process—see later).

For the purposes of this invention an "aqueous dispersion" means a dispersion of the polymers in a liquid carrier medium of which water is the principle component (at least 50 weight %, more usually at least 80 weight %, of the carrier medium). Minor amounts of organic liquids may optionally be present. The dispersion will typically comprise colloidally dispersed particles of the polyurethane and vinyl polymers, i.e. will typically be in the form of an aqueous latex.

It has thus been discovered that aqueous polymer dispersions according to the invention provide coatings of exceptionally good block resistance and exceptionally good imprint resistance, the high block resistance and high imprint resistance surprisingly being found not to be a mere consequence of the hardness of the coating or of the glass transition temperature of the vinyl polymer component (as might have been expected). Further, as mentioned above, the invention dispersions provide coatings of good resistance to many chemicals and solvents including, e.g. household chemicals.

It is essential that at least 70 weight % of the polyisocyanate component used in making the polyurethane prepolymer is an aliphatic polyisocyanate(s), this term (for the sake of clarity) being intended to mean compounds in which all the isocyanate groups are directly bonded to aliphatic or cycloaliphatic groups, irrespective of whether aromatic groups are also present. More preferably the amount of aliphatic polyisocyanate is at least 85 weight %, and most preferably 100 wt %, of the polyisocyanate component.

Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate, hydrogenated 2,6-toluene diisocyanate, and 1-isocyanato-1-methyl-3(4)-isocyanatomethyl-cyclohexane (IMCI).

Suitable non-aliphatic polyisocyanates (if used) include p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, and 1,5-naphthylene diisocyanate.

Mixtures of polyisocyanates can be used and also polyisocyanates which have been modified by the introduction of urethane, allophanate, urea, biuret, carbodiimide, uretonimine or isocyanurate residues.

Preferred aliphatic polyisocyanates are cycloaliphatic polyisocyanates such as 4,4'-dicyclohexylmethane diisocyanate.

The organic poly(isocyanate-reactive group) component used in the synthesis of the polyurethane prepolymer will normally consist essentially of an organic polyol component, i.e. a component consisting essentially of at least one organic polyol. Nevertheless it is within the scope of the invention for the organo poly(isocyanate-reactive group) component to comprise in addition to, or as an alternative to, an organic polyol(s), a poly(isocyanate-reactive group) compound(s) which is other than a polyol (s)—provided of course that at least some of the isocyanate-reactive groups of the poly(isocyanate-reactive groups) component are hydroxyl groups. Examples of such other compounds include compounds in which one or more of the isocyanate-reactive groups are primary or secondary amino groups, such as ethanolamine. Other examples include 3-amino-2,2-dimethylpropane-1-ol (neopentanolamine), 2-amino-1-butanol, monoisopropylamine, N-methylethanolamine, and in general Michael adducts from 1 mole of a primary amine with 2-hydroxyethyl acrylate or Michael adducts from ethanolamine and acrylic monomers.

The acid-bearing poly(isocyanate-reactive group) compound(s) used in the production of the polyurethane prepolymer is normally an acid bearing polyol(s), and is preferably a low molecular weight (<500) carboxylic acid—bearing polyol, in particular a diol or triol, whereby carboxylate anion groups are provided by the carboxylic acid groups. (While normally being used directly in the prepolymer synthesis, i.e. as a separate component, it is within the scope of the invention, although much less preferred, for it to be first incorporated into a higher molecular weight polyol, e.g. a polyester polyol, e.g. by reaction with a dicarboxylic acid component used in the higher molecular weight polyol preparation). Particularly preferred are dihydroxyalkanoic acids of formula

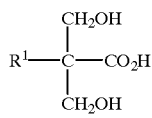

where $R^1$ is hydrogen or alkyl (usually 1–5 C). By far the most preferred carboxyl-bearing polyol is 2,2-dimethylol propionic acid (DMPA).

The conversion of the acid groups present in the prepolymer to anionic salt groups may be effected (where necessary) by neutralising the acid groups with a suitable base such as ammonia or triethylamine.

A critical feature of the invention is that the acid value of the prepolymer must be ≧44 mg KOH/g prepolymer. Below this level, poor block and imprint resistance tends to result. A preferred upper level for the acid value of the prepolymer is 100 mg KOH/g prepolymer. A more preferred range for prepolymer acid value is from 48 to 80 mg KOH/g, most preferably 56–70 mg KOH/g.

Where DMPA is employed as the acid-bearing polyol(s), as is most preferred, a prepolymer acid value of 44 mg KOH/g corresponds to an amount of ca 10.6% by weight of DMPA in the prepolymer reactants.

Another critical feature of the invention is that the prepolymer reactants are used in amounts corresponding to a ratio of isocyanate groups to isocyanate-reactive groups within the range of 1.4/1 to 2.9/1. In the case when the poly(isocyanate-reactive group) component consists essentially of an organic polyol component, i.e. is either entirely an organic polyol(s) or if not entirely are organic polyol(s) then any organic poly(isocyanate-reactive group) compound (s) other than a polyol(s) used in the synthesis having no material effect on the properties of the resulting product, then the above-mentioned critical feature of the invention corresponds to a ratio of isocyanate groups to hydroxyl groups within the range of 1.4/1 to 2.9/1.

Below a ratio of 1.4/1 poor block resistance tends to result, even if the acid value is ≧44. Above a ratio of 2.9/1, an excessively hard blocky material is obtained, which is in any case is very expensive to produce (because of the high isocyanate content) and will contain much unreacted isocyanate, making the prepolymer difficult to disperse into water. More preferably the isocyanate/isocyanate-reactive group (normally hydroxyl) ratio is from 1.6/1 to 2.5/1.

The poly(isocyanate-reactive group) component (normally a polyol component) for making the prepolymer will almost always include one or more poly(isocyanate-reactive group) compounds (normally a polyol(s)) other than an acid-bearing poly(isocyanate-reactive group) compound (s).

In particular a polymeric polyol(s) of molecular weight from 500 to 6000 is normally present, and optionally a low molecular weight polyol(s) of molecular weight below 500 (i.e. in addition to acid-bearing compounds of the type discussed above).

Polymeric polyols having molecular weights in the range of 500–6000 which may be used in the preparation of the prepolymer particularly include diols and triols and mixtures thereof but higher functionality polyols may be used for example as minor components in admixture with diols. The polyols may be members of any of the chemical classes of polymeric polyols used or proposed to be used in polyurethane formulations. In particular, the polyols may be polyesters, polyesteramides, polyethers, polythioethers, polycarbonates, polyacetals, polyolefins or polysiloxanes. Preferred polyol molecular weights are from 700 to 3000.

Polyester polyols which may be used include hydroxyl-terminated reaction products of polyhydric alcohols as ethylene glycol, propylene glycol, diethylene glycol, neopentyl glycol, 1,4-butanediol, 1,6-hexanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylopropane, pentaerythritol or Bisphenol A. Especially useful polyesters include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polythioether polyols which may be used include products obtained by condensing thiodiglycol either alone or with other glycols, dicarboxylic acids, formaldehyde, aninoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene, or cycloaliphatic carbonates such as ethylene carbonate or propylene carbonate; dialkyl carbonate such as diethyl carbonate, can also be used.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo and copolymers.

Polyols having molecular weights below 500 which may optionally be used in the preparation of the prepolymer particularly include diols and triols and mixtures thereof but higher functionality polyols may be used. Examples of such lower molecular weight polyols include ethylene glycol, diethylene glycol, tetraethylene glycol, bis (hydroxyethyl) terephthalate, 1,4-cyclohexane dimethanol, furan dimethanol, glycerol and the reaction products, up to molecular weight 499, of such polyols with propylene and/or ethylene oxide.

The reactants to form the polyurethane prepolymer may optionally also include isocyanate-reactive materials bearing nonionic groups for introducing nonionic dispersing groups into the prepolymer structure. Such groups may e.g. be provided by employing as a reactant in the prepolymer formation a polyol (preferably a diol) having pendant polyoxyethylene chains such as those described in the prior art, e.g. U.S. Pat. No. 3,905,925. If present, the nonionic dispersing group content will usually be present in the range 0.5 to 25 g of nonionic dispersing groups (particularly polyethylene oxide groups) per 100 g polyurethane prepolymer.

The isocyanate-terminated polyurethane prepolymer may be prepared in conventional manner by reacting the organic polyisocyanate and poly (isocyanate-reactive group) components and any other reactants under substantially anhydrous conditions at a temperature between about 30° C. and about 130° C. until reaction between the isocyanate groups and the isocyanate-reactive (usually hydroxyl) groups is substantially complete.

If desired, catalysts such as dibutylin dilaurate or stannous octoate may be used to assist prepolymer formation. An organic solvent may optionally be added before, during or after prepolymer formation to control the viscosity. Suitable solvents which may be used include acetone, methylethylketone, dimethylformamide, diglyme, N-methylpyrrolidone, ethyl acetate, ethylene and propylene glycol diacetates, alkyl ethers of ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, acetone and dialkyl ethers of glycol acetates or mixtures of N-methylpyrrolidone and methyl ethyl ketone.

The aqueous polyurethane dispersion is preferably prepared by forming an aqueous dispersion of the isocyanate-terminated polyurethane prepolymer by dispersing it (optionally carried in an organic solvent medium) in an aqueous medium, preferably utilising the self-dispersibility properties of the prepolymer arising from the carboxylate anion groups (and nonionic groups if present) although free surfactant(s) may additionally be employed if desired, and chain extending the prepolymer with an active hydrogen-containing chain extender in the aqueous phase, the chain extender being present in the aqueous phase during dispersion or added subsequently (i.e. chain-extension can take place during and/or after the dispersion into water in this embodiment).

The prepolymer may be dispersed in water using techniques well known in the art. Preferably, the prepolymer is added to the water with agitation or, alternatively, water may be stirred into the prepolymer.

Alternatively, although less preferably, the prepolymer may be chain extended to form the polyurethane polymer while dissolved in an organic solvent (usually acetone) followed by the addition of water to the polymer solution until water becomes the continuous phase and the subsequent removal of solvent (e.g. by distillation) to form an aqueous dispersion (the well-known "acetone process").

The active hydrogen-containing chain extender compound(s) which may be reacted with the prepolymer is suitably a polyol, an amino-alcohol, a primary or secondary aliphatic, alicyclic, aromatic, araliphatic or heterocyclic diamine or polyamine, or hydrazine or a substituted hydrazine. Water-soluble chain extenders are preferred.

Water itself may be used as an indirect chain-extender (although not when using the "acetone process") because it will slowly convert some of the terminal isocyanate groups of the prepolymer to amino groups and the modified prepolymer molecules will than act as a chain-extender for the unreacted isocyanate-terminated prepolymer molecules. However this is very slow compared to chain-extension using the above mentioned active hydrogen chain extenders which will provide the predominant chain-extension reaction if used.

Examples of such chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3-dinitrobenzidine, 4,4'-diaminodiphenylmethane, methane diamine, m-xylene diamine, isophorone diamine, and adducts of diethylene triamine with acrylate or its hydrolysed products. Also materials such as hydrazine (e.g. in the form of its mono hydrate), azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid dihydrazide, oxalic acid dihydrazide, isophthalic acid dihydrazide, hydrazides made by reacting lactones with hydrazine such as gamma-hydroxylbutyric hydrazide, bis-semi-carbazide, and bis-hydrazide carbonic esters of glycols.

Where the chain extender is other than the modified prepolymer molecules formed by reaction with water (assuming the prepolymer dispersion into water embodiment is being used), for example a polyamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° C. to 90° C., more preferably 10 to 60° C.

The total amount of chain extender material(s) employed (other than water) should be approximately equivalent to the free-NCO groups in the prepolymer, the ratio of active hydrogens in the chain extender(s) to NCO groups in the prepolymer preferably being in the range from 0.7/1 to 2.0/1 more preferably 0.85/1 to 1.2/1. Of course, when water is employed as an indirect chain extender, these ratios will not be applicable since the water, functioning both as an indirect chain extender and a dispersing medium, will be present in a gross excess relative to the free-NCO groups.

The resulting polyurethane polymer (after chain extension) will often have a number average weight within the range of 10,000 to 300,000 daltons.

[It is evident from the foregoing that the term "polyurethane" as used in this specification is intended to apply not only to polymers (or prepolymers) having only urethane linkages formed from isocyanate and hydroxyl groups, but optionally also to polymers (or prepolymers) having, in addition to urethane linkages, linkages formed from isocyanate and —$NH_2$, —NH—, or —SH groups].

The polyurethane and vinyl polymers may be brought together by any suitable technique.

For example, an aqueous dispersion of the polyurethane and an aqueous dispersion of the vinyl polymer, separately prepared, may merely be blended together (with agitation if necessary). In another method, the polyurethane prepolymer could in principle be dispersed into an aqueous dispersion of a preformed vinyl polymer with simultaneous or subsequent chain extension of the prepolymer.

More preferred, however, is to perform the preparation of the vinyl polymer in-situ in the presence of the polyurethane polymer during and/or after its formation. In such an embodiment the vinyl monomer(s) for making the vinyl polymer may be introduced in the process at any suitable stage. For example, where an aqueous dispersion of the prepolymer is formed in the process to make the polyurethane polymer (as is preferred) all of the vinyl monomer(s) may be added to the prepolymer prior to its dispersion into water, or all of the vinyl monomer(s) may be added subsequent to dispersion (or may have already been added to the water prior to the dispersion of the prepolymer therein), or part of the monomer(s) may be added to the prepolymer prior to dispersion and the remainder added subsequent to dispersion (or the remainder may have already been added to the water prior to the dispersion of the prepolymer therein). In the case where all or part of the monomer(s) is added to the prepolymer prior to dispersion into water, such monomer(s) could be added to the prepolymer subsequent to its formation or prior to its formation, or some could be added subsequent to its formation and some added prior to its formation. In the case where any vinyl monomer(s) is added prior to the prepolymer formation it may provide at least part of a solvent system for the reaction to form the prepolymer (if it possesses suitable solvent characteristics).

The vinyl polymer of the invention composition is normally made by an aqueous free-radical polymerisation process. When made in-situ, and where an aqueous dispersion of the polyurethane prepolymer is formed in the process to make the polyurethane polymer, with chain extension being carried out in the aqueous phase (as is preferred), the vinyl polymerisation may be performed simultaneously with the chain extension step, or performed subsequent to the chain extension step, or performed partly simultaneously with the chain-extension step and partly subsequent to the to the chain extension step. If the "acetone process" is adopted for making the polyurethane polymer (see above for a discussion of this technique) wherein chain extension occurs in an organic solvent phase (usually acetone), the vinyl polymerisation is normally performed subsequent to the chain extension step after removal of solvent to form an aqueous dispersion of the polyurethane polymer (although it would, in principle, be possible to perform the vinyl polymerisation in the solvent, disperse the urethane/vinyl polymer into water, and then remove the solvent).

All of the vinyl monomer(s) to be polymerised may be present at the commencement of the vinyl polymerisation, or alternatively in cases where all or part of the monomer(s) to be polymerised has been introduced subsequent to the formation of an aqueous prepolymer dispersion, or, in the case of using the "acetone process", normally subsequent to the formation of the chain extended polyurethane aqueous dispersion (although it would, in principle, be possible to add the vinyl monomer(s) at the prepolymer formation stage), some or all of that monomer(s) may be added to the reaction medium during the course of the polymerisation (in one or more stages or continuously).

By a vinyl polymer herein is meant a homo or copolymer derived from the addition polymerisation (using a free radical initiated process and usually in an aqueous medium) of one or more olefinically unsaturated monomers. If the vinyl polymer has been made using an in-situ technique (see above) it preferably has an acid value of $\leq 15$ mg KOH/g. A high acid content in the in-situ-formed vinyl polymer would tend to destabilise the resulting dispersion. Particularly preferred vinyl polymers are acrylic polymers (i.e. based predominantly on at least one ester of acrylic or methacrylic acid).

It is to be understood that in some embodiments it is possible for two or more vinyl polymers (usually two, as formed e.g. in a sequential or multistage vinyl polymerisation process), instead of just one vinyl polymer, to be present in the dispersion (this being a commonly understood equivalence) so that the term "vinyl polymer" extends to 1 or more vinyl polymers.

The polymerisation of the at least one vinyl monomer to form the vinyl polymer will require the use of a free-radical-yielding initiator(s) to initiate the vinyl polymerisation. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and i-ascorbic acid. Azo compounds such as azoisobutyronitrile may also be used. Metal compounds such Fe. EDTA (EDTA is ethylene diamine tetracetic acid) may also be usefully employed as part of the redox initiator system. We particularly prefer to use an initiator system partitioning between the aqueous and organic phases, e.g. a combination of t-butyl hydroperoxide, iso-ascorbic acid and Fe.EDTA. The amount of initiator or initiator system to use is conventional, e.g. within the range 0.05 to 6 wt % based on the total vinyl monomer(s) used.

An aqueous vinyl polymerisation carried out in the absence of the polyurethane normally needs to be performed in the presence of a stabilising and/or dispersing material, and when making an aqueous latex of a vinyl polymer, a conventional emulsifying agent would need to be employed (e.g. anionic and/or non-ionic emulsifiers such as Na salts of dialkylsulphosuccinates, Na salts of sulphated oils, Na salts of alkyl sulphonic acids, Na, K and ammonium alkyl sulphates, $C_{22-24}$ fatty alcohols, ethyoxylated fatty acids and/or fatty amides, and Na salts of fatty acids such as Na stearate and Na oleate; the amount used is usually 0.1 to 5% by weight on the weight based on the total olefinically unsaturated monomer(s) used). When incorporated using an in-situ process, however, the polyurethane polymer containing anionic (and optionally nonionic) dispersing groups usually removes the requirement for the use of a separately added conventional emulsifying agent since the polyurethane itself acts as an effective dispersant for the vinyl polymerisation, although a conventional emulsifier can be still employed if desired.

Examples of vinyl monomers which may be used to form the vinyl polymer include 1,3-butadiene, isoprene, styrene, α-methyl styrene, divinyl benzene, acrylonitronitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

$CH_2=CR^2COOR^3$ wherein $R^2$ is H or methyl and $R^3$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethylmethacrylate 2-hydroxypropyl methacrylate, 2-hydroxypropyl acrylate, and their modified analogues like Tone M-100 (Tone is a trademark of Union Carbide Corporation). Olefinically unsaturated monocarboxylic and/or dicarboxylic acids, such as acrylic acid, methacrylic acid, fumaric acid, and itaconic acid, are other examples which can be used, but in the case of making the vinyl polymer using an in-situ technique should preferably only be employed to provide a small level of copolymerised units in the polymer such that the acid value of the resulting vinyl polymer is $\leq 15$ mg KOH/g. More preferably acid-bearing vinyl monomer(s) is not employed at all for in-situ formed vinyl polymers. When the vinyl polymer is preformed (and e.g. incorporated by simple blending), the acid level need not be preferably limited in this way.

Particularly preferred are vinyl polymers made from a monomer system comprising at least 40 weight % of one or more monomers of the formula $CH_2=CR^2COOR^3$ defined above. Such preferred polymers are defined herein as acrylic polymers. More preferably, the monomer system contains at least 50 weight % of such monomers, and particularly at least 60 weight %. The other monomers in such acrylic polymers (if used) may include one or more of the other vinyl monomers mentioned above, and/or may include ones different to such other monomers. Styrene is a useful other monomer. Preferred (meth)acrylic ester monomers include methyl methacrylate, n-butyl acrylate, n-butyl methacrylate, and 2-ethylhexyl acrylate.

The glass transition temperature (Tg) of the vinyl polymer may vary within a wide range, a possible range being from −50 to 120° C. In a preferred embodiment, a multistage process may be formed to form the vinyl polymer (as mentioned above), so that there will be, in effect, two (or more) vinyl polymers formed having two or more Tg's of which, more preferably, at least two Tg's differ by at least 30° C., more preferably at least 60° C. The number average molecular weight of the or each vinyl polymer will often be in the range of from 10,000 to 300,000 daltons.

The weight ratio of the polyurethane polymer component to the vinyl polymer component should be within the range of from 30/70 to 5/95, more preferably from 25/75 to 10/90.

The aqueous dispersions of the invention typically have a solids content of from about 20 to 60% by weight, more usually from 25 to 50% by weight.

The aqueous dispersions of the invention are particularly useful as or for providing the principle component of coating compositions (e.g. protective, decorative or adhesive coating compositions) for which purpose they may be further diluted with water and/or organic solvents, or they may be supplied in more concentrated form by evaporation of water and/or organic components of the liquid medium. As coating compositions, they may be applied to a variety of substrates including wood, board, metals, stone, concrete, glass, cloth, leather, paper plastics, foam and the like, by any conventional method including brushing, dipping, flow coating, spraying, and the like. They are, however, particularly useful for providing coatings on wood and board substrates. The aqueous carrier medium is removed by natural or accelerated (by heat) drying to form a coating. The compositions may contain other conventional ingredients including coalescing organic solvents, pigments, dyes, emulsifiers, surfactants, thickeners, heat stabilisers, levelling agents, anti-cratering agents, fillers, sedimentation inhibitors, UV absorbers, antioxidants and the like introduced at any stage of the production process or subsequently. It is possible to include an amount of antimony oxide in the dispersions to enhance the fire retardant properties.

If desired the aqueous dispersion of the invention can be used in combination with other polymer dispersions or solutions which are not according to the invention.

The present invention is now illustrated by reference to the following examples. Unless otherwise specified, all parts, percentages and ratios are on a weight basis. The Tg's of polymers quoted are those calculated using the Fox equation.

In the examples the following abbreviations or terms are used.

| St | styrene |
| MMA | methyl methacrylate |
| EHA | 2-ethyl hexyl acrylate |
| BA | n-butyl acrylate |
| BMA | n-butyl methacrylate |
| Tg | Glass transition temperature |
| "Desmodur" W | 4,4'-dicyclohexylmethane diisocyanate |
| DMPA | 2,2-dimethylol propionic acid |
| "Voranol" P2000 | poly(propylene glycol) diol of molecular weight 2000 |
| NMP | N-methyl pyrollidone |
| EDTA | ethylene diamine tetracetic acid |
| "Terethane" 1000 | poly(tetrahydrofuran) diol of molecular weight 1000 |
| AV | Acid Value (mg KOH/g of polymer solids) |
| IPDI | Isophorone diisocyanate |
| 1,4-CHDM | 1,4 cyclohexanedimethanol |
| "Oxyflex" S-105-55 | polyesterdiol of molecular weight ca. 2000 |
| U/A Ratio | weight ratio of urethane/acrylic polymers |

EXAMPLE 1

In this example a 20/80 U/A dispersion is made, with the acrylic polymer being formed in-situ in the presence of the polyurethane (which acts as a stabiliser). The polyurethane prepolymer is poly(propylene glycol)diol based. The NCO/OH ratio is 2.0 and the AV of the prepolymer is 62 mg KOH/g. The acrylic polymer component is St/2-EHA and has a Tg of 25° C. (being polymerised in three batches, which all have the same monomer composition so that effectively only one vinyl polymer is made).

Preparation of Aqueous Polyurethane Dispersion

| Recipe Prepolymer: | |
| --- | --- |
| Component | Parts |
| "Desmodur" W | 922.09 |
| DMPA | 216.00 |
| "Voranol" P 2000 | 301.91 |
| NMP | 360.00 |
| Stannous octoate (catayst) | 0.31 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 7.72% (theoretical 8.21%). The prepolymer was neutralised with 162.97 parts triethylamine at 75° C. The mixture was blended for half an hour. The neutralised prepolymer was dispersed in 5404.53 parts of demineralised water during 60 minutes. After dispersion, 75.87 parts hydrazine monohydrate were added to extend the prepolymer.

The final polyurethane dispersion had a pH of 7.5, solids content of 20% and a viscosity of 100 mPas at 25° C.

Preparation of Aqueous Polyurethane/vinyl Polymer Dispersion

| Recipe | |
| --- | --- |
| Component | Parts |
| Polyurethane dispersion | 600.00 |
| Demineralised water | 551.25 |
| Styrene | 75.10 |
| 2-ethyl hexylacrylate | 44.90 |
| t-Butyl hydroperoxide (10% solution in water) | 9.27 |
| FeEDTA (1% solution in water) | 2.11 |
| Iso-ascorbic acid (1% solution in water) | 10.43 |
| Styrene | 100.13 |
| 2-ethyl hexylacrylate | 59.87 |
| Iso-ascorbic acid (1% solution in water) | 13.92 |
| Styrene | 125.17 |
| 2-ethyl hexylacrylate | 74.83 |
| Iso-ascorbic acid (1% solution in water) | 17.40 |
| Iso-ascorbic acid (1% solution in water) | 17.40 |
| Iso-ascorbic acid (1% solution in water) | 17.40 |

The following process was used to prepare an aqueous polyurethane/acrylic polymer dispersion with a polyurethane/acrylic polymer weight ratio of 20/80. 600.00 parts of the polyurethane dispersion prepared above, was charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added: 551.25 parts demineralised water followed by 75.10 parts Styrene and 44.90 parts 2-EHA. The reactor contents were stirred at 35°

C. for one hour. Then the t-butyl hydroperoxide solution, 9.27 parts, was added to this mixture, followed by 2.11 parts of the Fe EDTA solution and 10.43 parts iso-ascorbic acid solution which started the reaction. The batch was kept at peak temperature for 15 minutes. After the batch was cooled to 25° C., 100.13 parts Styrene and 59.87 parts 2-EHA were added, and the contents stirred for one hour. To this mixture 13.92 parts of iso-ascorbic acid solution was added and the reaction started. The batch was kept at peak temperature for 15 minutes. After the batch was cooled to 25° C., the remaining monomers, 125.17 parts Styrene and 74.83 parts 2-EHA were added. The contents were mixed for one hour, 17.40 parts of the iso-ascorbic acid solution were added which started the radical polymerisation. After 5 minutes another 17.40 parts of iso-ascorbic acid solution were added and the batch was kept at peak temperature for 15 minutes. Then the final 17.40 parts of iso-ascorbic acid solution were added. The mixture was stirred for half an hour and cooled to room temperature.

The resulting polyurethane/acrylic polymer dispersion had the following specification: 35% solids, pH of 8, viscosity of 220 mPas of 25° C., absorbance at 650 nm of 145.

EXAMPLE 2

This example is similar to that of Example 1 (same AV) and only the acrylic polymer composition is changed. While it is again polymerised in three batches, the composition of the first batch is BA/MMA with Tg of 30° C., and differs from the composition of the second and third batch, both BA homopolymer (i.e. effectively one polymer) with Tg of −50° C. (Thus the acrylic polymer is a sequential polymer).

Preparation of Aqueous Polyurethane Dispersion

| Recipe Prepolymer: | |
|---|---|
| Component | Parts |
| "Desmodur" W | 922.09 |
| DMPA | 216.00 |
| Voranol P 2000 | 301.91 |
| NMP | 360.00 |
| Stannous octoate (catalyst) | 0.31 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 7.72% (theoretical 8.21%). The prepolymer was neutralised with 162.97 parts triethylamine at 75° C. The mixture was blended for half an hour. The neutralised prepolymer was dispersed in 5404.53 parts of demineralised water during 60 minutes. After dispersion, 75.87 parts hydrazine monohydrate were added to extend the prepolymer.

The final polyurethane dispersion had a pH of 7.5, solids content of 20% and a viscosity of 100 mPas at 25° C.

Preparation of Aqueous Polyurethane/Vinyl Polymer Dispersion

| Recipe | |
|---|---|
| Component | Parts |
| Polyurethane dispersion | 696.65 |
| Demineralised water | 643.93 |
| Butyl acrylate | 52.61 |
| Methyl Methacrylate | 86.72 |
| t-Butyl hydroperoxide (16% solution in water) | 10.76 |
| FeEDTA (1% solution in water) | 2.45 |
| Iso-ascorbic acid (1% solution in water) | 12.12 |
| Butyl Acrylate | 185.78 |
| Iso-ascorbic acid (1% solution in water) | 16.16 |
| Butyl Acrylate | 232.22 |
| Iso-ascorbic acid (1% solution in water) | 20.20 |
| Iso-ascorbic acid (1% solution in water) | 20.20 |
| Iso-ascorbic acid (1% solution in water) | 20.20 |

The following process was used to prepare an aqueous polyurethane/acrylic polymer dispersion with a polyurethane/acrylic polymer weight ratio of 20/80. 696.65 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added: 643.93 parts demineralised water followed by 52.61 parts Butyl Acrylate and 86.72 parts Methyl Methacrylate. The reactor contents were stirred at 35° C. for one hour. Then the t-butyl hydroperoxide solution, 10.76 parts, was added to this mixture, followed by 2.45 parts of the Fe EDTA solution and 12.12 parts iso-ascorbic acid solution which started the reaction. The batch was kept at peak temperature for 15 minutes. After the batch was cooled to 25° C., 185.78 parts Butyl Acrylate was added, and the contents stirred for one hour. To this mixture 16.16 parts of iso-ascorbic acid solution was added and the reaction started. The batch was kept at peak temperature for 15 minutes. After the batch was cooled to 25° C., the remaining monomers, 232.22 parts Butyl Acrylate was added. The contents were mixed for one hour, 20.20 parts of the iso-ascorbic acid solution was added which started the radical polymerisation. After 5 minutes another 20.20 parts of iso-ascorbic acid solution was added and the batch was kept at peak temperature for 15 minutes. Then the final 20.20 parts of iso-ascorbic acid solution was added. The mixture was stirred for half an hour and cooled to room temperature.

The resulting polyurethane/acrylic polymer dispersion had the following specification: 35% solids, pH of 8, viscosity of 45 mPas of 25° C., absorbance at 650 nm of 17.

EXAMPLE 3

This example again concerns a 20/80 U/A dispersion (AV of 62 mg KOH/g), but is stabilised with a different polyurethane. The polyurethane is based on a prepolymer which contains different type of polyether polyol, namely a poly-TFF. The NCO/OH reactant ratio of the prepolymer is 1.8 instead of 2.0. The prepolymer also contains BA which is used as a reactive diluent, which will be polymerised during the radical polymerisations after the polyurethane prepolymer is dispersed and extended. The acrylic part is not polymerised according to the previous triple batch method, but the monomers were fed over approximately 1 hour and directly polymerised. The Tg of the acrylic part was increased to 62° C. and consists of MMA/Styrene/BA.

Preparation of Aqueous Polyurethane Dispersion

| Recipe Prepolymer: | |
|---|---|
| Component | Parts |
| IPDI | 314.77 |
| DMPA | 84.00 |
| Terethane 1000 | 161.22 |
| NMP | 70.00 |
| Butyl Acrylate | 70.00 |
| Stannous octoate (catalyst) | 0.19 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 7.02% (theoretical 7.55%). The prepolymer was neutralised with 62.11 parts triethylamine at 75° C. The mixture was blended for half an hour. The neutralised prepolymer was dispersed in 1132.12 parts of demineralised water during 60 minutes. After dispersion, 24.79 parts hydrazine monohydrate were added to extend the prepolymer.

The final polyurethane dispersion had a pH of 7.5, solids content of 25% and a viscosity of 100 mPas at 25° C.

Preparation of Aqueous Polyurethane/vinyl Polymer Dispersion

| Recipe | |
|---|---|
| Component | Parts |
| Polyurethane dispersion | 479.62 |
| Demineralised water | 575.46 |
| t-Butyl hydroperoxide (10% solution in water) | 30.24 |
| Butyl Acrylate | 75.85 |
| Methyl Methacrylate | 188.21 |
| Styrene | 201.36 |
| Iso-ascorbic acid (1% solution in water) (catalyst feed) | 144.00 |
| t-Butyl hydroperoxide (10% solution in water) | 6.05 |
| Iso-ascorbic acid (1% solution in water) | 28.80 |

The following process was used to prepare an aqueous polyurethane/acrylic polymer dispersion with a polyurethane/acrylic polymer weight ratio of 20/80. 479.62 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added 575.46 parts demineralised water, and the batch heated to 50° C. The monomers, 75.85 parts Butyl Acrylate, 188.21 parts Methyl Methacrylate and 201.36 parts Styrene, were charged to a feeding funnel. 10% of this charge was fed to the reactor, followed by 10% of the 144 parts of iso-ascorbic acid, and the reactor contents heated to 65° C. After 10 minutes, the batch was heated to 75° C. and the monomer and catalyst feed were started. The temperature was elevated to 80° C. when the feed was completed, and 6.05 parts of a tBHPO solution and 28.80 parts of an iso-ascorbic acid solution added. The mixture was stirred for half an hour and cooled to room temperature.

The resulting polyurethane/acrylic polymer dispersion had the following specification: 35% solids, pH of 7.5, viscosity of 60 mPas of 25° C., absorbance at 650 nm of 255.

EXAMPLE 4

This example is a modification of Example 3 which is based on a polyurethane made with a lower AV, viz 45 mg KOH/g instead of 62 mg KOH/g. The Tg of the acrylic part is again 62° C.

Preparation of Aqueous Polyurethane Dispersion

| Recipe Prepolymer: | |
|---|---|
| Component | Parts |
| IPDI | 314.77 |
| DMPA | 61.60 |
| Terethane 1000 | 159.27 |
| NMP | 70.00 |
| Butyl Acrylate | 70.00 |
| Stannous octoate (catalyst) | 0.19 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 7.27% (theoretical 7.55%). The prepolymer was neutralised with 45.55 parts triethylamine at 75° C. The mixture was blended for half an hour. The neutralised prepolymer was dispersed in 1150.32 parts of demineralised water during 60 minutes. After dispersion, 25.67 parts hydrazine monohydrate were added to extend the prepolymer.

The final polyurethane dispersion had a pH of 7.5, solids content of 27.5% and a viscosity of 150 mPas at 25° C.

Preparation of Aqueous Polyurethane/vinyl Polymer Dispersion

| Recipe | |
|---|---|
| Component | Parts |
| Polyurethane dispersion | 435.41 |
| Demineralised water | 619.67 |
| t-Butyl hydroperoxide (10% solution in water) | 30.24 |
| Butyl Acrylate | 75.85 |
| Methyl Methacrylate | 188.21 |
| Styrene | 201.36 |
| Iso-ascorbic acid (1% solution in water) (catalyst feed) | 144.00 |
| t-Butyl hydroperoxide (10% solution in water) | 6.05 |
| Iso-ascorbic acid (1% solution in water) | 28.80 |

The following process was used to prepare an aqueous polyurethane/acrylic polymer dispersion with a polyurethane/acrylic polymer weight ratio of 20/80. 435.41 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added 619.67 parts demineralised water, and the batch heated to 50° C. The monomers, 75.85 parts Butyl Acrylate, 188.21 parts Methyl Methacrylate and 201.36 parts Styrene were charged to a feeding funnel. 10% of this charge was fed to the reactor, followed by 10% of the 144 parts of iso-ascorbic acid, and the reactor contents heated to 65° C. After 10 minutes, the batch was heated to 75° C. and the monomer and catalyst feed were started. The temperature was elevated to 80° C. when the feed was completed, and 6.05 parts of a tBHPO solution and 28.80 parts of a iso-ascorbic acid solution added. The mixture was stirred for half an hour and cooled to room temperature.

The resulting polyurethane/acrylic polymer dispersion had the following specification: 35% solids, pH of 7.4, viscosity of 35 mPas of 25° C., absorbance at 650 nm of 120.

Comparative Example

This comparative example is a modification of Examples 3 and 4, and has a still lower AV of 27 mg KOH/g (taking it outside the scope of the invention). The Tg of the acrylic part is again 62° C.

Preparation of Aqueous Polyurethane Dispersion

| Recipe Prepolymer: | |
| --- | --- |
| Component | Parts |
| IPDI | 314.77 |
| DMPA | 36.40 |
| 1.4-CHDM | 51.75 |
| Terethane 1000 | 157.08 |
| NMP | 70.00 |
| Butyl Acrylate | 70.00 |
| Stannous octoate (catalyst) | 0.19 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 6.97% (theoretical 7.55%). The prepolymer was neutralised with 26.91 parts triethylamine at 75° C. The mixture was blended for half an hour. The neutralised prepolymer was dispersed in 1147.01 parts of demineralised water during 60 minutes. After dispersion, 24.99 parts hydrazine monohydrate were added to extend the prepolymer.

The final polyurethane dispersion had a pH of 7.5, solids content of 30.0% and a viscosity of 100 mPas at 25° C.

Preparation of Aqueous Polyurethane/vinyl Polymer Dispersion

| Recipe | |
| --- | --- |
| Component | Parts |
| Polyurethane dispersion | 435.41 |
| Demineralised water | 619.67 |
| t-Butyl hydroperoxide (10% solution in water) | 30.24 |
| Butyl Acrylate | 75.85 |
| methyl Methacrylate | 188.21 |
| Styrene | 201.36 |
| Iso-ascorbic acid (1% solution in water) (catalyst feed) | 144.00 |
| t-Butyl hydroperoxide (10% solution in water) | 6.05 |
| Iso-ascorbic acid (1% solution in water) | 28.80 |

The following process was used to prepare an aqueous polyurethane/acrylic polymer dispersion with a polyurethane/acrylic polymer weight ratio of 20/80. 435.41 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion were added 619.67 parts demineralised water, and the batch heated to 50° C. The monomers, 75.85 parts Butyl Acrylate, 188.21 parts Methyl Methacrylate and 201.36 parts Styrene, were charged to a feeding funnel. 10% of this charge was fed to the reactor, followed by 10% of the 144 parts of iso-ascorbic acid, and the reactor contents heated to 65° C. After 10 minutes, the batch was heated to 75° C. and the monomer and catalyst feed were started. The temperature was elevated to 80° C. when the feed was completed, and 6.05 parts of a tBHPO solution and 28.80 parts of a iso-ascorbic acid solution were added. The mixture was stirred for half an hour and cooled to room temperature.

The resulting polyurethane/acrylic polymer dispersion had the following specification:

35% solids, pH of 7, viscosity of 70 mPas of 25° C., absorbance at 650 nm of 15.

EXAMPLE 5

This example provides a 20/80 U/A dispersion based on a polyurethane which is related to the polyurethane used in Example 1. The polyurethane which is used to stabilise the acrylic part of Example 1 differs on two points: the AV value of the prepolymer is increased, 83 mg KOH/g instead of 62 mg KOH/g, and the NCO/OH reactant ratio is decreased to 1.8 (instead of 2.0). The acrylic part has the same Tg as in Example 1 (i.e 25° C.), but the monomers used differ; MMA/BA/BMA instead of Styrene and 2-EHA. The radical polymerisation method which is used is the same as in Example 1.

Preparation of Aqueous Polyurethane Dispersion

| Recipe Prepolymer: | |
| --- | --- |
| Component | Parts |
| "Desmodur" W | 277.89 |
| DMPA | 77.00 |
| Voranol P 2000 | 30.11 |
| NMP | 165.00 |
| Stannous octoate (catalyst) | 0.15 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 6.85% (theoretical 7.20%). The prepolymer was neutralised with 56.93 parts triethylamine at 75° C. The mixture was blended for half an hour. The neutralised prepolymer was dispersed in 1359.60 parts of demineralised water during 60 minutes. After dispersion, 20.20 parts hydrazine monohydrate were added to extend the prepolymer.

The final polyurethane dispersion had a pH of 7.5, solids content of 20% and a viscosity of 500 mPas at 25° C.

Preparation of Aqueous Polyurethane/vinyl Polymer Dispersion

| Recipe | |
|---|---|
| Component | Parts |
| Polyurethane dispersion | 475.00 |
| Demineralised water | 660.29 |
| Butyl acrylate | 19.00 |
| Butyl methacrylate | 44.82 |
| Methyl Methacrylate | 31.18 |
| t-Butyl hydroperoxide (10% solution in water) | 11.78 |
| FeEDTA (1% solution in water) | 1.67 |
| Iso-ascorbic acid (1% solution in water) | 8.27 |
| Butyl Acrylate | 25.33 |
| Butyl methacrylate | 59.76 |
| Methyl methacrylate | 41.58 |
| Iso-ascorbic acid (1% solution in water) | 11.02 |
| Butyl Acrylate | 31.67 |
| Butyl methacrylate | 74.70 |
| Methyl methacrylate | 51.96 |
| Iso-ascorbic acid (1% solution in water) | 13.77 |
| Iso-ascorbic acid (1% solution in water) | 13.77 |
| Iso-ascorbic acid (1% solution in water) | 13.77 |

The following process was used to prepare an aqueous polyurethane/acrylic polymer dispersion with a polyurethane/acrylic polymer weight ratio of 20/80. 475.00 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added: 660.29 parts demineralised water followed by 19.00 parts Butyl Acrylate, 44.82 parts Butyl Methacrylate and 31.18 parts Methyl Methacrylate. The reactor contents were stirred at 35° C. for one hour. Then the t-butyl hydroperoxide solution, 11.78 parts, was added to this mixture, followed by 1.67 parts of the Fe EDTA solution and 8.27 parts iso-ascorbic acid solution which started the reaction. The batch was kept at peak temperature for 15 minutes. After the batch was cooled to 25° C., 25.33 parts Butyl Acrylate, 59.76 parts Butyl Methacrylate and 41.58 parts of Methyl Methacrylate were added, and the contents stirred for one hour. To this mixture 11.02 parts of iso-ascorbic acid solution were added and the reaction started. The batch was kept at peak temperature for 15 minutes. After the batch was cooled to 25° C., the remaining monomers, 31.67 parts Butyl Acrylate, 74.70 parts Butyl Methacrylate and 51.96 parts Methyl Methacrylate were added. The contents were mixed for one hour, 13.77 parts of the iso-ascorbic acid solution were added which started the radical polymerisation. After 5 minutes another 13.77 parts of iso-ascorbic acid solution were added and the batch was kept at peak temperature for 15 minutes. Then the final 13.77 parts of iso-ascorbic acid solution were added. The mixture was stirred for half an hour and cooled to room temperature.

The resulting polyurethane/acrylic polymer dispersion had the following specification: 30% solids, pH of 7.3, viscosity of 40 mPas of 25° C., absorbance at 650 nm of 9.

EXAMPLE 6

This example provides a 10/90 U/A based on a polyurethane which is related to the polyurethane used in Example 1. The polyurethane prepolymer differs on two points: the polyether polyol is replaced by a polyester polyol and the NCO/OH reactant ratio is increased to 2.3 (was 2.0). The Tg of the acrylic part is again 25° C.

Preparation of Aqueous Polyurethane Dispersion

| Recipe Prepolymer: | |
|---|---|
| Component | Parts |
| "Desmodur" W | 343.10 |
| DMPA | 72.00 |
| Oxyflex S-105-55 | 64.90 |
| NMP | 120.00 |
| Stannous octoate (catalyst) | 0.15 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 10.25% (theoretical 10.36%). The prepolymer was neutralised with 54.32 parts triethylamine at 75° C. The mixture was blended for half an hour. The neutralised prepolymer was dispersed in 2653.34 parts of demineralised water. After dispersion, 32.98 parts hydrazine monohydrate were added to extend the prepolymer.

The final polyurethane dispersion had a pH of 7.5, solids content of 15% and a viscosity of 50 mPas at 25° C.

Preparation of Aqueous Polyurethane/vinyl Polymer Dispersion

| Recipe | |
|---|---|
| Component | Parts |
| Polyurethane dispersion | 300.00 |
| Demineralised water | 497.73 |
| Butyl acrylate | 18.36 |
| Methyl Methacrylate | 26.64 |
| t-Butyl hydroperoxide (10% solution in water) | 12.56 |
| FeEDTA (1% solution in water) | 1.78 |
| Iso-ascorbic acid (1% solution in water) | 3.92 |
| Butyl Acrylate | 24.48 |
| Methyl methacrylate | 35.52 |
| Iso-ascorbic acid (1% solution in water) | 5.22 |
| Butyl Acrylate | 30.60 |
| Methyl methacrylate | 44.40 |
| Iso-ascorbic acid (1% solution in water) | 6.53 |
| Butyl Acrylate | 91.80 |
| Methyl methacrylate | 133.20 |
| Iso-ascorbic acid (1% solution in water) | 19.58 |
| Iso-ascorbic acid (1% solution in water) | 19.58 |
| Iso-ascorbic acid (1% solution in water) | 19.58 |

The following process was used to prepare an aqueous polyurethane/acrylic polymer dispersion with a polyurethane/acrylic polymer weight ratio of 10/90. 300.00 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added: 497.73 parts demineralised water followed by 18.36 parts Butyl Acrylate and 26.64 parts Methyl Methacrylate. The reactor contents were stirred at 35° C. for one hour. Then the t-butyl hydroperoxide solution, 12.56 parts, was added to this mixture, followed by 1.78 parts of the Fe EDTA solution and 3.92 parts iso-ascorbic acid solution which started the reaction. The batch was kept at peak temperature for 15 minutes. After the batch was cooled to 25° C., 24.48 parts Butyl Acrylate and 35.52 parts of Methyl Methacrylate were added, and the contents stirred for one hour. To this mixture 5.22 parts of iso-ascorbic acid solution were added and the reaction started. The batch was kept at peak temperature for 15 minutes. After the batch was cooled to 25° C., the penultimate monomer phase, 30.60 parts Butyl Acrylate and 44.40 parts Methyl Methacrylate was added. The contents were mixed for one hour, and 6.53 parts of the iso-ascorbic acid solution were added which started the radical polymerisation. After the batch was cooled to 25° C., the remaining monomers 91.80 parts Butyl Acrylate and 133.20 parts of Methyl Methacrylate were added, and the contents stirred for one hour. To this mixture 19.58 parts of iso-ascorbic acid solution were added and the reaction started. After 5 minutes another 19.58 parts of iso-ascorbic acid solution were added and the batch was kept at peak temperature for 15 minutes. Then the final 19.58 parts of iso-ascorbic acid solution were added. The mixture was stirred for half an hour and cooled to room temperature.

The resulting polyurethane/acrylic polymer dispersion had the following specification: 35% solids, pH of 8.4, viscosity of 60 mPas of 25° C., absorbance at 650 nm of 25.

EXAMPLE 7

This example provides a 25/75 urethane/acrylic polymer and is based on a very similar polyurethane to that of Example 6. The only difference is the increased NCO/OH reactant ratio, 2.5 instead of 2.3 (in Example 6). The acrylic part of Example 7 is sequential and is polymerised in three batches. The first and second batches contain MMA and BA in the same relative proportions, each polymer having Tg of 90° C., and the third batch contains MMA and BA of a different composition giving Tg of 10° C.

Preparation of Aqueous Polyurethane Dispersion

| Recipe Prepolymer: | |
|---|---|
| Component | Parts |
| "Desmodur" W | 365.66 |
| DMPA | 72.00 |
| Oxyflex S-105-55 | 42.34 |
| NMP | 120.00 |
| Stannous octoate (catalyst) | 0.15 |

The urethane prepolymer was prepared in a three neck round bottom flask, equipped with a thermometer, mechanical stirrer and heating mantle. It was made under a nitrogen atmosphere. Half of the stannous octoate was added to the other prepolymer components before heating the mixture. The other half of the stannous octoate was added after one hour reaction at a temperature of 90° C. The residual NCO content was 11.45% (theoretical 11.72%). The prepolymer was neutralised with 54.32 parts triethylamine at 75° C. The mixture was blended for half an hour. The neutralised prepolymer was dispersed in 2665.96 parts of demineralised water. After dispersion, 36.85 parts hydrazine monohydrate were added to extend the prepolymer.

The final polyurethane dispersion had a pH of 7.3, solids content of 15% and a viscosity of 50 mPas at 25° C.

Preparation of Aqueous Polyurethane/vinyl Polymer Dispersion

| Recipe | |
|---|---|
| Component | Parts |
| Polyurethane dispersion | 400.00 |
| Demineralised water | 78.99 |
| Butyl acrylate | 3.78 |
| Methyl Methacrylate | 56.22 |
| t-Butyl hydroperoxide (10% solution in water) | 5.58 |
| FeEDTA (1% solution in water) | 0.79 |
| Iso-ascorbic acid (1% solution in water) | 5.22 |
| Butyl Acrylate | 5.04 |
| Methyl methacrylate | 74.96 |
| Iso-ascorbic acid (1% solution in water) | 6.96 |
| Butyl Acrylate | 20.40 |
| Methyl methacrylate | 19.60 |
| Iso-ascorbic acid (1% solution in water) | 3.48 |
| Iso-ascorbic acid (1% solution in water) | 3.48 |
| Iso-ascorbic acid (1% solution in water) | 3.48 |

The following process was used to prepare an aqueous polyurethane/acrylic polymer dispersion with a polyurethane/acrylic polymer weight ratio of 25/75. 400.00 parts of the polyurethane dispersion prepared above, were charged to a round bottom flask, equipped with a thermometer, mechanical stirrer, condenser and heating mantle. During the preparation of the polyurethane/acrylic polymer dispersion a nitrogen atmosphere was maintained. To the polyurethane dispersion was added: 78.99 parts demineralised water followed by 3.78 parts Butyl Acrylate and 56.22 parts Methyl Methacrylate. The reactor contents were stirred at 35° C. for one hour. Then the t-butyl hydroperoxide solution, 5.58 parts, was added to this mixture, followed by 0.79 parts of the Fe EDTA solution and 5.22 parts iso-ascorbic acid solution which started the reaction. The batch was kept at peak temperature for 15 minutes. After the batch was cooled to 25° C., 5.04 parts Butyl Acrylate and 74.96 parts of Methyl Methacrylate were added, and the contents stirred for one hour. To this mixture 6.96 parts of iso-ascorbic acid solution were added and the reaction started. The batch was kept at peak temperature for 15 minutes. After the batch was cooled to 25° C., the remaining monomers 20.40 parts Butyl Acrylate and 19.60 parts of Methyl Methacrylate were added, and the contents stirred for one hour. To this mixture 3.48 parts of iso-ascorbic acid solution were added and the reaction started. After 5 minutes another 3.48 parts of iso-ascorbic acid solution were added and the batch was kept at peak temperature for 15 minutes. Then the final 3.48 parts of iso-ascorbic acid solution were added. The mixture was stirred for half an hour and cooled to room temperature.

The resulting polyurethane/acrylic polymer dispersion had the following specification: 35% solids, pH of 8.1, viscosity of 80 mPas of 25° C., absorbance at 650 nm of 35.

The results of testing of the dispersions made in Examples 1 to 7 (and the Comparative Example) are provided in the following table, and illustrate the advantages achieved by the present invention.

The tests were performed according to the following procedures.

The dispersions was formulated with 8% (w/w) butylglycol and 1% (w/w) of a 1% (w/w) aqueous solution of Fluowet FSB (a levelling agent). These formulations were used for all the tests described below.

1. Koenig Hardness

This method is based on DIN 53157 (although is not an exact copy of it). It assesses the damping behaviour of a coating, which is influenced by the elastic and viscoelastic properties of the coating.

Clean glass plates were coated with 80 µm wet films of the above described formulations. They were dried at room temperature for one hour. The coated glass plates were placed at an oven at 52° C. for 16 hours. The coated substrates were conditioned at room temperature for 2 hours, before the hardness was determined with an Erichsen type 299/300 equipment for hardness measurements.

2. Block Resistance

This measurement is done in order to determine whether two layers of a coating will stick together under influence of temperature and pressure.

A 100 µm wet film of each formulated dispersions is applied onto a Leneta Opacity test chart (form 2C). The coating is dried at room temperature for 5 minutes and then placed in the oven at 60° C. for 20 minutes. Immediately after this the test chart is cut into pieces of 3.3×5 cm. Two pieces of each coating are put onto each other with the coated sides towards each other, so that they form a cross. These test strips are then placed in a Blocking tester (ex Koehler Instrument Company) with a pressure of 3 kg/cm². The Blocking tester is placed in the oven for 4 hours at 60° C. After that the Blocking tester is taken out of the oven. The test strips are taken out of the Blocking tester and kept at room temperature for 30 minutes. After that the two pieces are separated from each other. The damage to the coated substrates is determined. A rating of 0 means that the film is severely damaged; 5 means that the film is not affected at all: see imprint test.

3. Imprint Resistance

This test ascertains whether the backside of the hardboard panel leaves a mark on the coated side of another hardboard panel when stacked during a certain period of time and with a certain pressure and temperature.

Equipment
3.1 Wire rod 150 µm
3.2 Oven at 50° C.
3.3 Hardboard panels (also flat or particle board) with a smooth top surface and a back side of a rough structure, size 15×30 cm.
3.4 Koehler Instrument Company Blocking tester (spring no.1)

Procedure
4.1 Apply with the wire rod of 150 µm a layer of each formulated dispersion onto the hardboard.
4.2 Dry this panel for 2 minutes at room temperature, 20 minutes at 50° C. and cool down for 5 minutes at room temperature.
4.3.1 Cut this panel in pieces of 5×15 cm.
4.3.2 Cut an uncoated panel in pieces of 4×15 cm.
4.4.1 Place an uncoated piece with the rough back side in the interface and parallel on the coated piece (without touching the edges).
4.4.2 Repeat this in duplicate.
4.5.1 Place the whole of this in the Blocking tester and apply a pressure of 1.5 kg/cm².
4.5.2 Place the Blocking tester for 16 hours in the oven at 50° C.
4.5.3 Remove the pieces from the Blocking tester, but leave them stacked, and let them cool down for 30 minutes.
4.6 Try to remove the pieces from each other and assess the imprint resistance as follows:
  on a scale of 0 to 5
  5: excellent test results; pieces can be removed from each other without damaging the coating or leaving on it a mark of the rough back side of the board.
  0: poor test results; severe damaging of the coating, and a clear mark of the board is left behind into the coating.

Spot Tests (Resistance to Water, Coffee and Detergent)

These were measured as follows. A 100 µm wet film is applied onto a Leneta Opacity test chart (form 2C-available from the Leneta Company, USA) and dried for 20 minutes at room temperature. The test chart is placed in an oven at 52° C. for 64 hours. The test chart is conditioned at room temperature for 8 hours. The test liquids are placed on the coated test chart for 16 hours. The spots are removed and the film underneath assessed. A rating of 0 means that the film is severely damaged by the test liquid; 5 means that the film is not affected at all. The liquids used for testing were water, coffee and "Andy" (a commonly-used liquid detergent in Holland).

| Example | Koenig Hardness (sec) | Block resistance | Imprint resistance | water spot (16 h) | Coffee spot (16 h) | Detergent spot (16 h) |
|---|---|---|---|---|---|---|
| 1 | 140 | 4 | 3 | 5 | 4–5 | 5 |
| 2 | 30 | 4 | 3 | 4–5 | 1–2 | 3 |
| 3 | 200 | 3–4 | 5 | 5 | 4–5 | 5 |
| 4 | 200 | 3 | 3 | 5 | 5 | 5 |
| 5 | 120 | 4–5 | 3 | 5 | 4–5 | 5 |
| 6 | 125 | 2–3 | 3 | 5 | 5 | 5 |
| 7 | 165 | 4–5 | 5 | 4 | 3 | 4–5 |
| comparative | 200 | 1 | 1–2 | 5 | 5 | 5 |

Key for resistances:
0 = bad,
1 = moderate,
2 = reasonable,
3 = good,
4 = very good,
5 = excellent

What is claimed is:

1. Aqueous polymer dispersion containing a water-dispersed polyurethane polymer and a vinyl polymer in a weight ratio of from 30/70 to 5/95, wherein said polyurethane polymer is the reaction product of:

A) an isocyanate-terminated polyurethane prepolymer having an acid value of $\geq 44$ mg KOH/g of prepolymer (solids) and is formed from reactants comprising an organic polyisocyanate component and an organic poly (isocyanate-reactive group) component in which the isocyanate-reactive groups are selected from —OH and optionally one or more of —NH$_2$—, —NH—, and —SH, wherein
  i) at least 70 weight % of said polyisocyanate component is constituted by at least one aliphatic polyisocyanate,
  ii) said poly(isocyanate-reactive group) component includes at least one acid bearing poly(isocyanate-reactive group) compound for providing anionic groups which provide or contribute to water-dispersibility,
  iii) the reactants are used in amounts corresponding to a ratio of isocyanate groups to isocyanate-reactive groups within the range of 1.4/1 to 2.9/1; and B) an active hydrogen chain-extending compound(s), and wherein said vinyl polymer is derived from one or more monomers selected from the group consisting of esters of acrylic acid and methacrylic acid of formula

wherein $R^2$ is H or methyl and $R^3$ is alkyl or cycloalkyl of 1 to 20 carbon atoms, 1,3-butadiene, isoprene, styrene, α-methyl styrene, divinyl benzene, acrylonitrile, methacrylonitrile, vinyl halides, vinyl esters, alkyl esters of mono-olefinically unsaturated dicarboxylic acids, hydroxyalkyl(meth)acrylates, and olefinically unsaturated monocarboxylic and/or dicarboxylic acids.

2. Aqueous dispersion according to claim 1 wherein said organic poly(isocyanate-reactive group) component used in the production of the polyurethane prepolymer consists essentially of a polyol component, and wherein the reactants are used in amounts corresponding to a ratio of isocyanate groups to hydroxy groups within the range of 1.4/1 to 2.9/1.

3. Aqueous dispersion according to either claim 1 or claim 2 wherein said aqueous dispersion is in the form of an aqueous polymer latex.

4. Aqueous dispersion according to claim 1 wherein said isocyanate-terminated polyurethane prepolymer has an acid value within the range 44 to 100 mg KOH/g prepolymer (solids).

5. Aqueous dispersion according to claim 4 wherein said acid value is within the range of from 48 to 80 mg KOH/g prepolymer (solids).

6. Aqueous dispersion according to claim 1 wherein said at least one aliphatic polyisocyanate component is selected from the group consisting of one or more of ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate, hydrogenated 2,6-toluene diisocyanate, and 1-isocyanate-1-methyl-3(4)-isocyanatomethyl-cyclohexane (IMCI).

7. Aqueous dispersion according to claim 1 wherein the amount of aliphatic polyisocyanate is at least 85 weight % of the polyisocyanate component.

8. Aqueous dispersion according to claim 1 wherein said at least one acid-bearing poly(isocyanate-reactive group) compound for providing anionic groups is a low molecular (<500) carboxylic acid-bearing polyol.

9. Aqueous dispersion according to claim 8 wherein said carboxyl-bearing polyol is 2,2-dimethylol propionic acid.

10. Aqueous dispersion according to claim 1 wherein the conversion of the acid groups present in the prepolymer to anionic groups has been effected, where necessary, by neutralising the acid groups with a base.

11. Aqueous dispersion according to claim 1 wherein the ratio of isocyanate groups to said isocyanate-reactive groups is within the range of from 1.6/1 to 2.5/1.

12. Aqueous dispersion according to claim 1 wherein said poly(isocyanate-reactive group) component includes a polymeric polyol(s) of number average molecular weight from 500 to 6000.

13. Aqueous dispersion according to claim 1 wherein said poly(isocyanate-reactive group) component includes a poly(isocyanate-reactive group) compound(s) of number average molecular weight below 500 in addition to an acid bearing compound (ii).

14. Aqueous dispersion according to claim 1 wherein the reactants to form the polyurethane prepolymer includes an isocyanate-reactive material bearing non-ionic group(s) for introducing nonionic dispersing groups into the prepolymer.

15. Aqueous dispersion according to claim 1 wherein said polyurethane polymer and said vinyl polymer are present as a blend of the preformed polymers.

16. Aqueous dispersion according to claim 1 wherein said vinyl polymer has been formed in-situ in the presence of the polyurethane polymer during and/or after its formation.

17. Aqueous dispersion according to claim 16 wherein the vinyl polymer has an acid value of 15≦mg KOH/g.

18. Aqueous dispersion according to claim 1 wherein said vinyl polymer component has been formed using a multi-stage polymerisation process to form two or more vinyl polymers of different composition.

19. Aqueous dispersion according to claim 18 wherein said two or more vinyl polymers have two or more different Tg's of which at least two Tg's differ by at least 30° C.

20. Aqueous dispersion according to claim 1 wherein said vinyl polymer has been formed using an aqueous emulsion polymerisation process.

21. Aqueous dispersion according to claim 1 wherein said vinyl polymer is an acrylic polymer.

22. Aqueous dispersion according to claim 1 wherein the weight ratio of the polyurethane component to the vinyl component is within the range of from 25/75 to 10/90.

23. Process for the production of an aqueous polymer dispersion containing a water-dispersed polyurethane polymer and a vinyl polymer, wherein said process comprises:

I synthesising an isocyanate-terminated polyurethane prepolymer having an acid value of ≧44 mg KOH/g of prepolymer (solids) from reactants comprising an organic polyisocyanate component and an organic poly(isocyanate-reactive group) component in which the isocyanate-reactive groups are selected from —OH and optionally one or more of —NH$_2$, —NH—, and —SH, wherein i) at least 70 weight % of said polyisocyanate component is constituted by at least one aliphatic polyisocyanate, ii) said poly(isocyanate-reactive group) component includes at least one acid-bearing poly(isocyanate-reactive group) compound for providing anionic groups which provide or contribute to water-dispersibility, iii) the reactants are used in amounts corresponding to a ratio of isocyanate groups to isocyanate-reactive groups within the range of 1.4/1 to 2.9/1;

II chain extending the polyurethane prepolymer using an active hydrogen chain extending compound(s) to form a polyurethane polymer;

III forming an aqueous dispersion of said polyurethane polymer;

IV incorporating a vinyl polymer into said polyurethane polymer dispersion, whereby the weight ratio of the polyurethane polymer to the vinyl polymer is within the range of from 30/70 to 5/95, said vinyl polymer being derived from one or more monomers selected from the group consisting of esters of acrylic acid and methacrylic acid of formula

wherein $R^2$ is H or methyl and $R^3$ is alkyl or cycloalkyl of 1 to 20 carbon atoms, 1,3-butadiene, isoprene, styrene, α-methyl styrene, divinyl benzene, acrylonitrile, methacrylonitrile, vinyl halides, vinyl esters, alkyl esters of mono-olefinically unsaturated dicarboxylic acids, hydroxyalkyl(meth)acrylates, and olefinically unsaturated monocarboxylic and/or dicarboxylic acids.

24. Process according to claim 23 wherein said organic poly(isocyanate-reactive group) component used in the production of the polyurethane prepolymer consists essentially of a polyol component, and wherein the reactants are used in amounts corresponding to a ratio of isocyanate groups to hydroxyl groups within the range of 1.4/1 to 2.9/1.

25. Process according to either claim 23 or claim 24 wherein said chain extension step II is carried out simultaneously with the step of forming an aqueous dispersion III by dispersion of the polyurethane prepolymer into an aqueous medium containing the chain extending compound(s), or into an aqueous medium into which the chain extending compound is subsequently incorporated.

26. Process according to claim 23 wherein said vinyl polymer is formed in-situ in the presence of the polyurethane polymer during and/or after its formation.

27. Process according to claim 23 wherein said vinyl polymer is incorporated into said polyurethane polymer dispersion as a preformed polymer.

28. Process according to claim 23 wherein said vinyl polymer component has been formed by a multistage polymerisation process to form two or more vinyl polymers of different composition.

29. Process according to claim 23 wherein said vinyl polymer is an acrylic polymer.

30. Coating obtained or derived from an aqueous composition comprising an aqueous polymer dispersion according to claim 1.

31. Method of coating a substrate using an aqueous polymer composition comprising an aqueous polymer dispersion according to claim 1.

32. Substrate having a coating obtained or derived from an aqueous polymer composition comprising an aqueous polymer dispersion according to claim 1.

33. A method of coating a material selected from the group consisting of wood, board, metal, stone, concrete, glass, cloth, leather, paper, plastics and foam which comprises applying thereto a coating composition comprising an aqueous dispersion according to claim 1.

34. A substrate according to claim 32 comprising wood or board.

35. Aqueous dispersion according to claim 5 wherein said acid value is within the range of from 56 to 70 mg KOH/g prepolymer solids.

36. Aqueous dispersion according to claim 7 wherein the amount of aliphatic polyisocyanate is 100 weight % of the polyisocyanate component.

37. Aqueous dispersion according to claim 8 wherein the polyol is a dihydroxyalkanoic acid of the formula

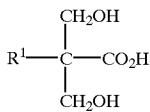

where $R^1$ is hydrogen or $C_{1-5}$-alkyl.

38. Aqueous dispersion of claim 10 wherein the neutralising base is ammonia or triethylamine.

39. Aqueous dispersion of claim 13 wherein the poly(isocyanate-reactive group) compound is a polyol.

40. Aqueous dispersion of claim 19 wherein at least two Tg's differ by at least 60° C.

41. An aqueous polymer dispersion according to claim 1 wherein the esters of acrylic acid and methacrylic acid are selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, the vinyl halide is vinyl chloride, the vinyl esters are selected from the group consisting of vinyl acetate, vinyl propionate, vinyl laurate and vinyl esters of versatic acid, the alkyl esters of mono-olefinically unsaturated dicarboxylic acid are selected from di-n-butyl maleate and di-n-butyl fumarate, the hydroxyalkyl(meth)acrylates are selected from the group consisting of hydroxyethyl acrylate, hydroxyethylmethacrylate, 2-hydroxypropyl methacrylate, and 2-hydroxypropyl acrylate, and the olefinically unsaturated mono and/or dicarboxylic acids are selected from acrylic acid, methacrylic acid, fumaric acid and itaconic acid.

42. Process according to claim 23 wherein the vinyl polymer is derived from esters of acrylic acid and methacrylic acid of formula $$CH_2=CR^2COOR^3$$

wherein $R^2$ is H or methyl and $R^3$ is optionally substituted alkyl or cycloalkyl of 1 to 20 carbon atoms, 1,3-butadiene, isoprene, styrene, α-methyl styrene, divinyl benzene, acrylonitrile, methacrylonitrile, vinyl halides, vinyl ester, alkyl esters of mono-olefinically unsaturated dicarboxylic acids, hydroxyalkyl(meth)acrylates, and olefinically unsaturated monocarboxylic and/or dicarboxylic acids.

43. Process according to claim 42 wherein wherein the esters of acrylic acid and methacrylic acid are selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, the vinyl halide is vinyl chloride, the vinyl esters are selected from the group consisting of vinyl acetate, vinyl propionate, vinyl laurate and vinyl esters of versatic acid, the alkyl esters of mono-olefinically unsaturated dicarboxylic acid are selected from di-n-butyl maleate and di-n-butyl fumarate, the hydroxyalkyl(meth)acrylates are selected from the group consisting of hydroxyethyl acrylate, hydroxyethylmethacrylate, 2-hydroxypropyl methacrylate, and 2-hydroxypropyl acrylate, and the olefinically unsaturated mono and/or dicarboxylic acids are selected from acrylic acid, methacrylic acid, fumaric acid and itaconic acid.

44. Aqueous polymer dispersion containing a water-dispersed polyurethane polymer and a vinyl polymer in a weight ratio of from 30/70 to 5/95, said vinyl polymer being one which does not covalently bond to said polyurethane polymer, wherein said polyurethane polymer is the reaction product of:

A) an isocyanate-terminated polyurethane prepolymer having an acid value of ≧44 mg KOH/g of prepolymer (solids) and formed from reactants comprising an organic polyisocyanate component and an organic poly(isocyanate-reactive group) component in which the isocyanate-reactive groups are selected from —OH and optionally one or more of —NH$_2$—, —NH—, and —SH, wherein i) at least 70 weight % of said polyisocyanate component is constituted by at least one aliphatic polyisocyanate, ii) said poly(isocyanate-reactive group) component includes at least one acid bearing poly(isocyanate-reactive group) compound for providing anionic groups which provide or contribute to water-dispersibility, iii) the reactants are used in amounts corresponding to a ratio of isocyanate groups to isocyanate-reactive groups within the range of 1.4/1 to 2.9/1; and B) an active hydrogen chain-extending compound(s).

* * * * *

UNITED STATES PATENT AND TRADEMARK OFFICE
CERTIFICATE OF CORRECTION

PATENT NO.    : 6,362,273 B1
DATED         : March 26, 2002
INVENTOR(S)   : Martin et al.

It is certified that error appears in the above-identified patent and that said Letters Patent is hereby corrected as shown below:

<u>Title page,</u>
Item [22], please correct the filing date to read: -- September 16, 1998 --.

Signed and Sealed this

Thirteenth Day of May, 2003

JAMES E. ROGAN
*Director of the United States Patent and Trademark Office*